United States Patent
Nemchinsky

[11] Patent Number: 6,066,827
[45] Date of Patent: May 23, 2000

[54] ELECTRODE WITH EMISSIVE ELEMENT HAVING CONDUCTIVE PORTIONS

[75] Inventor: Valerian Nemchinsky, Florence, S.C.

[73] Assignee: The Esab Group, Inc., Florence, S.C.

[21] Appl. No.: 09/151,040

[22] Filed: Sep. 10, 1998

Related U.S. Application Data

[60] Provisional application No. 60/058,415, Sep. 10, 1997.

[51] Int. Cl.[7] .................................................. B23K 9/00
[52] U.S. Cl. ................................ 219/121.52; 219/121.51
[58] Field of Search ............................ 219/121.52, 74, 219/121.48, 121.49, 121.59, 75

[56] References Cited

U.S. PATENT DOCUMENTS

| | | | |
|---|---|---|---|
| 3,086,103 | 4/1963 | Hackman et al. | 219/74 |
| 3,198,932 | 8/1965 | Weatherly . | |
| 3,597,649 | 8/1971 | Bykhovsky et al. . | |
| 3,639,161 | 2/1972 | Trattner . | |
| 3,930,139 | 12/1975 | Bykhovsky et al. . | |
| 4,229,873 | 10/1980 | Bykhovsky et al. . | |
| 4,304,984 | 12/1981 | Bolotnikov et al. . | |
| 4,392,047 | 7/1983 | Bykhovsky et al. . | |
| 4,766,349 | 8/1988 | Johansson et al. . | |
| 5,023,425 | 6/1991 | Severance, Jr. . | |
| 5,083,005 | 1/1992 | Degrigny . | |
| 5,124,525 | 6/1992 | Severance, Jr. et al. . | |
| 5,200,594 | 4/1993 | Okada et al. . | |
| 5,451,739 | 9/1995 | Nemchinsky et al. . | |
| 5,660,743 | 8/1997 | Nemchinsky | 219/121.5 |
| 5,676,864 | 10/1997 | Walters | 219/121.52 |
| 5,767,478 | 6/1998 | Walters . | |
| 5,951,888 | 9/1999 | Oakley | 219/121.52 |

*Primary Examiner*—Teresa Walberg
*Assistant Examiner*—Quang Van
*Attorney, Agent, or Firm*—Alston & Bird LLP

[57] ABSTRACT

The invention relates to an emissive element for supporting an electric arc in a plasma arc torch using an oxygen gas to create the plasma. The element includes a body having a front face for supporting the electric arc which is defined by at least two distinct components formed from different materials. The first component is an emissive material having a low work function for readily emitting electrons in support of the arc and being reactive with the oxygen plasma gas to form an oxide during an operation of the torch. The oxide forms an electrically resistive layer on the front face of the body upon cooling subsequent to the operation of the torch. Hafnium is a preferred material for the first component. The second component comprises a conductive material having an electrical conductivity greater than the oxide layer for supporting the arc during the initiation of a subsequent torch operation at least until the oxide reaches an operating temperature. Silver and copper are preferred materials for the second component. The conductive material provides a conductive path which allows the arc to be supported thereon until the oxide layer reaches an operating temperature, thereby preventing thermal cracking and removal of the oxide layer. Accordingly, electrode start erosion is reduced.

26 Claims, 6 Drawing Sheets

ELECTRODE WITH EMISSIVE ELEMENT HAVING CONDUCTIVE PORTIONS

CROSS REFERENCE TO RELATED APPLICATIONS

This application claims the benefit of U.S. provisional application Ser. No. 60/058,415 filed Sep. 10, 1997.

FIELD OF THE INVENTION

The present invention relates to electrodes used in plasma arc torches, and more particularly to cylindrical emissive elements for electrodes for emitting an arc to a workpiece.

BACKGROUND OF THE INVENTION

Plasma arc torches are commonly used for the working of metals, including cutting, welding, surface treatment, melting, and annealing. Such torches include an electrode which supports an arc which extends from the electrode to the workpiece in the transferred arc mode of operation. It is also conventional to surround the arc with a swirling vortex flow of plasma gas, and in some torch designs it is conventional to also envelop the gas and arc with a swirling jet of water.

The electrode used in conventional torches of the described type typically comprises an elongate tubular member composed of a material of high thermal conductivity, such as copper or a copper alloy. The forward or discharge end of the tubular electrode includes a bottom end wall having an emissive element embedded therein which supports the arc. The element is composed of a material which has a relatively low work function, which is defined in the art as the potential step, measured in electron volts (ev), which permits thermionic emission from the surface of a metal at a given temperature. In view of its low work function, the element is thus capable of readily emitting electrons when an electrical potential is applied thereto.

When using an inert plasma gas, such as argon, the electrode may include a tungsten element for supporting the arc. The use of inert gases is not always convenient or economical and it is often preferable to use an oxygen gas, such as pure oxygen or air as the plasma gas. Tungsten electrodes cannot be successfully used with oxygen gases, however, because they oxidize too readily in such environments. Accordingly, commonly used emissive materials for oxygen plasma gases include hafnium, zirconium, and their alloys.

A design concern associated with torches of the described type is increasing the service life of the electrode. A significant factor in the service life of the electrode is erosion of the emissive element, which may be further defined to include both arc time erosion and start erosion. The average electrode erosion, therefore, depends on the average duration and frequency of the cuts. Empirical observations as to duration erosion and start erosion indicate that both components are approximately equal for an arc cycle of 30 seconds on followed by 4 seconds off. The present invention is primarily concerned with decreasing start erosion.

While not wishing to be bound by the theory, the inventor presents the following explanation of the start erosion mechanism. During its work as a cathode, the emissive element typically oxidizes, thereby forming a layer of oxide upon the outer surface of the element. In the case of hafnium, the layer includes both stoichiometric hafnium oxide, $HfO_2$, and a related hafnium oxide, $HfO_{1.7}$. Stoichiometric hafnium oxide is a relatively good emitter as well as a good conductor of heat and electricity. However, the oxide retains its conductive properties only when hot; when cold, the oxide becomes an insulator, as recognized by U.S. Pat. No. 5,083,005.

When starting an arc with electrodes of this type, the arc first attaches to the periphery of the emissive element and then migrates to the center of the electrode. The hafnium oxide is initially cold but is rapidly heated. The rapid heating causes thermal "shocks" to the brittle hafnium oxide which cracks as the arc travels to the center of the element. The hafnium oxide layer is thus broken up and removed from the surface of the element, contributing greatly to the start erosion problem. In addition, the particles of hafnium oxide may be deposited on the inner surface of the torch nozzle which provide attachment points for a second arc and increase the possibility of detrimental "double arcing."

This theory of the start erosion mechanism is supported by two additional observations. First, the hafnium oxides are created during each electrode use and are present at the start of the following cycle. The thickness of this oxide layer is approximately the same as the amount of erosion observed for each start. Second, some torches use a tungsten electrode in a hydrogen plasma gas. However, tungsten does not form a compound with hydrogen under these conditions and, indeed, no start erosion is readily observed for a tungsten electrode in a hydrogen plasma gas.

Accordingly, it is desirable to provide an emissive electrode element which exhibits reduced start erosion to promote longer service life and increased performance of the element. Such an element would be useful in an oxygen environment but would suffer to a lesser extent from the detrimental loss of an oxide layer upon starting. In addition, the emissive element should not be prohibitively expensive and would preferably utilize commonly available materials and manufacturing techniques.

SUMMARY OF THE INVENTION

The above and other objects and advantages of the present invention are achieved in the embodiments of the present invention described herein. More specifically, the invention includes an emissive element composed mostly of a material having a relatively low work function, such as hafnium. However, the element also includes at least one electrically conductive metal component, such as silver or copper, which creates one or more conductive paths on the face of the emissive element from the periphery to the center. The conductive path provides a way for the arc to travel to the center of the element upon starting without rapidly heating the hafnium oxide layer, thus avoiding any cracking of the hafnium oxide. The conductive path is preferably, but not necessarily continuous. Several embodiments are provided and the conductive paths may comprise one or more lines of metal extending across the face of the element, or one or more discrete portions distributed across the face of the element.

One particularly preferred embodiment of the emissive element has an elongate body having a front face for supporting the electric arc. The body includes a plurality of emissive filaments extending through the elongate body which define an array of adjacent emissive portions with interstices therebetween at the front face of the body. The filaments are formed of an emissive material having a low work function for readily emitting electrons in support of the arc. The body also includes an electrically conductive material filling the interstices between the adjacent emissive filaments at the front face of the elongate body, thereby defining at least one conductive path from the periphery of the electrode to the center thereof.

An associated method also forms a part of the invention and includes the steps of supplying an oxygen gas adjacent to an emissive element formed of two materials comprising an emissive material and a conductive material; applying an electric potential to the emissive element such that an electrical arc is supported by the emissive material which is formed of a material having a relatively low work function; oxidizing a portion of the emissive material adjacent to the arc; disconnecting the electrical potential such that the arc is extinguished and the oxidized portion of the emissive material is allowed to cool and thereby form an electrically resistive oxide layer; and reapplying the electrical potential to the emissive element and initiating an electric arc which is at least initially supported by the conductive material until the oxide layer reaches an operating temperature.

Accordingly, the present invention provides an emissive element which exhibits drastically reduced start erosion. The conductive material of the emissive element supports the arc at the initiation of torch operation which allows the brittle oxide layer on the surface of the emissive material to warm up more slowly. This in turn prevents thermal cracking and the oxide layer thus does not fall off the element. Accordingly, this erosion mechanism of the emissive element is significantly reduced and the overall service life of the electrode is improved. Moreover, the emissive element can be easily and economically manufactured without the need for advanced metallurgical techniques.

DETAILED DESCRIPTION OF THE PREFERRED EMBODIMENTS

Figure 1:
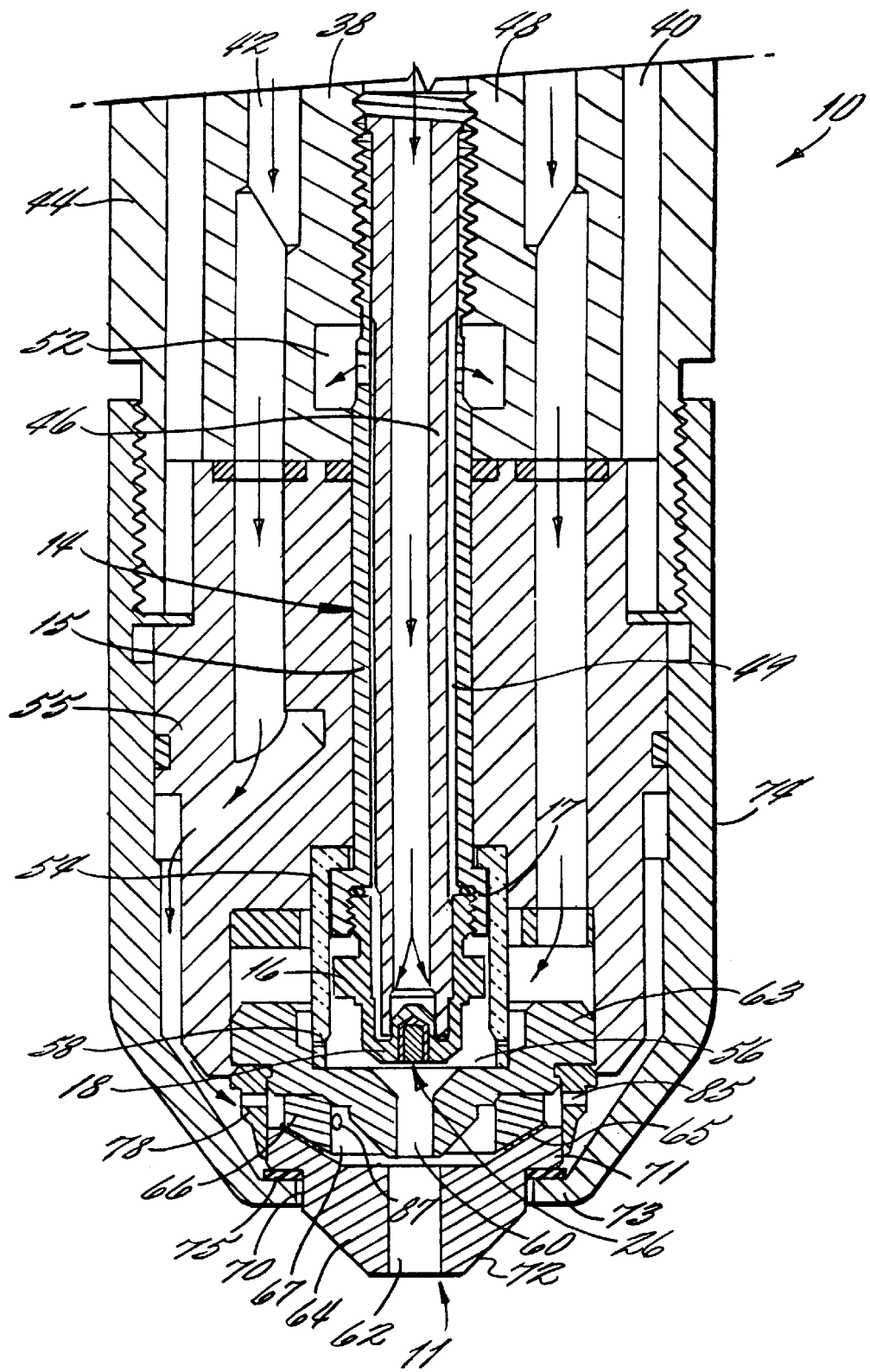
FIG. 1 is a sectional side elevation view of a plasma arc torch illustrating an emissive element according to the invention.
Figure 2:
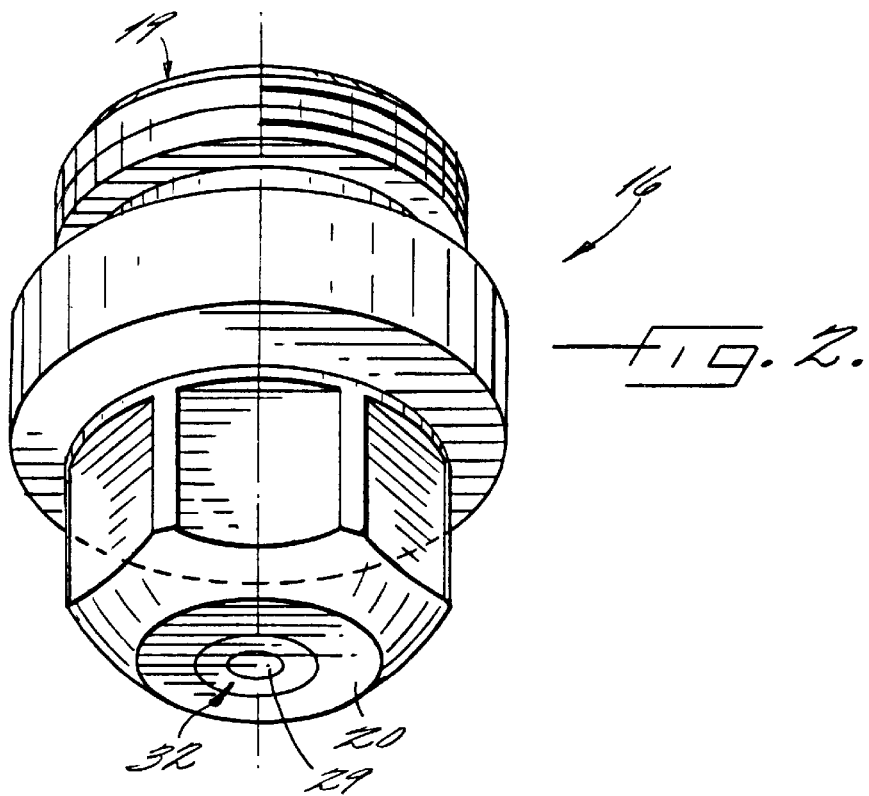
FIG. 2 is an enlarged perspective view of an electrode in accordance with the present invention.

With reference to FIG. 1, a plasma arc torch 10 embodying the features of the present invention is depicted. The torch 10 includes a nozzle assembly 11 and a tubular electrode 14. The electrode 14 preferably is made of copper or a copper alloy, and is composed of an upper tubular member 15 and a lower cup-shaped member or holder 16. The upper tubular member 15 is of elongate open tubular construction and defines the longitudinal axis of the torch 10. The upper tubular member 15 includes an internally threaded lower end portion 17. The holder 16 is also of tubular construction, and includes a lower front end and an upper rear end. A transverse end wall 18 closes the front end of the holder 16, and the transverse end wall 18 defines part of an outer front face 20 (FIG. 2). The rear end of the holder 16 is externally threaded and is threadedly joined to the lower end portion 17 of the upper tubular member 15.

Figure 3:
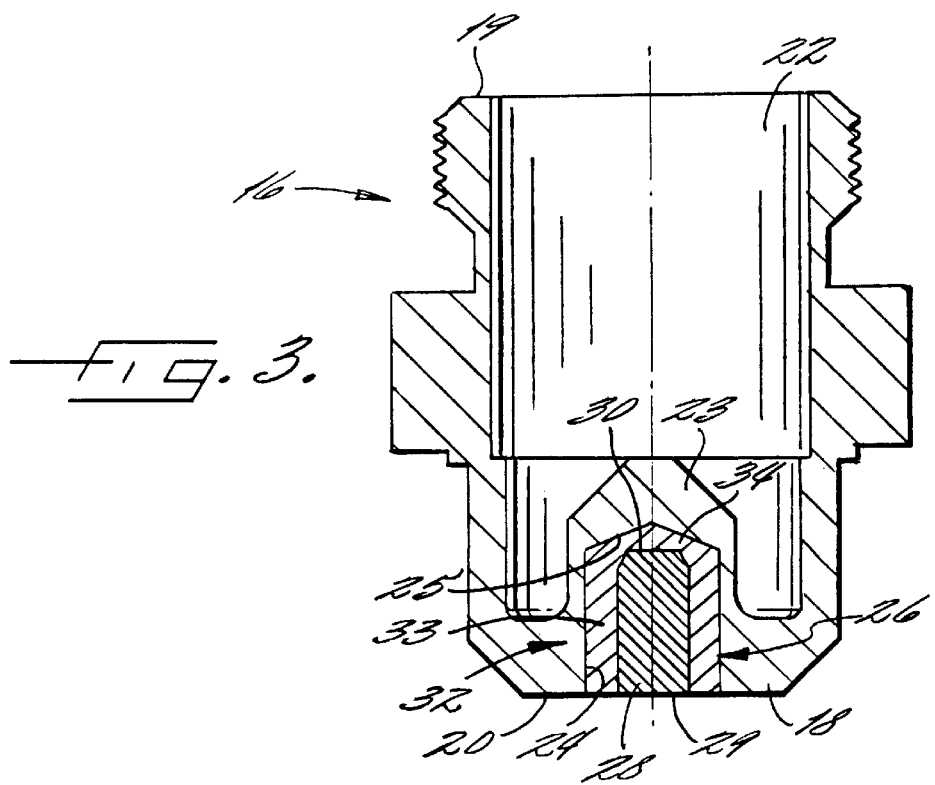
FIG. 3 is an enlarged sectional side elevational view of an electrode in accordance with the present invention.

With primary reference to FIGS. 2 and 3, the holder 16 is open at the rear end 19 thereof such that the holder is of cup-shaped configuration and defines an internal cavity 22. The front end wall 18 of the holder includes a cylindrical post 23 which extends rearwardly into the internal cavity 22 and along the longitudinal axis. A receptacle 24 is formed in the front face 20 of the end wall 18 and extends rearwardly along the longitudinal axis and into a portion of the length of the post 23. The receptacle 24 is generally cylindrical, and preferably includes a conical inner end wall 25. Preferably, the half angle of the conical inner end wall 25 is about 65° to 75°.

An emissive element assembly 26 is mounted in the receptacle 24 and comprises a generally cylindrical emissive element 28 which is disposed coaxially along the longitudinal axis and which has a circular outer end face 29 lying in the plane of the front face 20 of the holder 16. The emissive element 28 also includes a generally circular inner end face 30 which is disposed in the receptacle 24 and is opposite the outer end face 29. The unique composition of the emissive element 28 according to the invention is discussed in detail below.

The emissive element assembly 26 also includes a relatively non-emissive separator 32 which is positioned in the receptacle 24 coaxially about the emissive element 28. The separator 32 may have a peripheral wall 33 extending the length of the emissive element 28 and a closed bottom wall 34.

The separator 32 is composed of a metallic material having a work function which is greater than that of the material of the holder 16, and also greater than that of the material of the emissive element 28. More specifically, it is preferred that the separator be composed of a metallic material having a work function of at least about 4.3 ev, such as silver or silver alloys.

With reference again to FIG. 1, in the illustrated embodiment, the electrode 14 is mounted in a plasma arc torch body 38, which includes gas and liquid passageways 40 and 42, respectively. The torch body 38 is surrounded by an outer insulated housing member 44.

A tube 46 is suspended within the central bore 48 of the electrode 14 for circulating a liquid cooling medium such as water through the electrode structure 14. The tube 46 has an outer diameter smaller than the diameter of the bore 48 such that a space 49 exists between the tube 46 and the bore 48 to allow water to flow therein upon being discharged from the open lower end of the tube 46. The water flows from a source (not shown) through the tube 46, along the post 23 in the holder 16, and back through the space 49 to the opening 52 in the torch body 38 and to a drain hose (not shown).

For water injection torches, the passageway 42 directs injection water into the nozzle assembly 11 where it is converted into a swirling vortex for surrounding the plasma arc as further explained below.

The gas passageway 40 directs gas from a suitable source (not shown), through a gas baffle 54 of suitable high temperature material into a gas plenum chamber 56 via inlet holes 58. The inlet holes 58 are arranged so as to cause the gas to enter in the plenum chamber 56 in a swirling fashion. The gas flows out from the plenum chamber 56 through coaxial bores 60 and 62 of the nozzle assembly 11. The electrode 14 retains the gas baffle 54. A high-temperature plastic insulator body 55 electrically insulates the nozzle assembly 11 from the electrode 14.

An oxygen gas is advantageously used by the present invention. The term "oxygen gas" as used herein is intended to cover both pure oxygen and air, which has a substantial oxygen component. The term also applies to other plasma forming gases which have a sufficient oxygen component to oxidize the emissive material of the electrode. It has been determined that lower supply pressures for the oxygen gas work better than higher pressures with the electrode according to the invention.

The nozzle assembly 11 comprises an upper nozzle member 63 which defines the first bore 60, and a lower nozzle member 64 which defines the second bore 62. The upper nozzle member 63 is preferably a metallic material, and the lower nozzle member 64 is preferably a metallic or ceramic material. The bore 60 of the upper nozzle member 63 is in axial alignment with the longitudinal axis of the torch electrode 14.

The lower nozzle member 64 is separated from the upper nozzle member 63 by a plastic spacer element 65 and a water swirl ring 66. The space provided between the upper nozzle member 63 and the lower nozzle member 64 forms a water chamber 67.

The lower nozzle member 64 comprises a cylindrical body portion 70 which defines a forward or lower end portion and a rearward or upper end portion, with the bore 62 extending coaxially through the body portion 70. An annular mounting flange 71 is positioned on the rearward end portion, and a frustoconical surface 72 is formed on the exterior of the forward end portion coaxial with the second bore 62. The annular flange 71 is supported from below by an inwardly directed flange 73 at the lower end of the cup 74, with the cup 74 being detachably mounted by interconnecting threads to the outer housing member 44. A gasket 75 is disposed between the two flanges 71 and 73.

The bore 62 in lower nozzle member 64 is cylindrical, and is maintained in axial alignment with the bore 60 in the upper nozzle member 63 by a centering sleeve 78 of any suitable plastic material. Water flows from the passageway 42 through openings 85 in the sleeve 78 to the injection ports 87 of the swirl ring 66, which inject the water into the water chamber 67. The injection ports 87 are tangentially disposed around the swirl ring 66, to impart a swirl component of velocity to the water flow in the water chamber 67. The water exits the water chamber 67 through the bore 62.

A power supply (not shown) is connected to the torch electrode 14 in a series circuit relationship with a metal workpiece which is usually grounded. In operation, a plasma arc is established between the emissive element 28 of the electrode which acts as the cathode terminal for the arc, and the workpiece which is connected to the anode of the power supply and which is positioned below the lower nozzle member 64. The plasma arc is started in a conventional manner by momentarily establishing a pilot arc between the electrode 14 and the nozzle assembly 11, and the arc is then transferred to the workpiece through the bores 60 and 62.

The front face 29 of the emissive element 28 according to the invention includes at least two distinct components 12, 13 formed from different materials. An emissive material 13 comprises one of the components and is composed of a metallic material which has a relatively low work function, in a range of about 2.7 to 4.2 ev, so that it is adapted to readily emit electrons upon an electrical potential being applied thereto. Suitable examples of such materials are hafnium and alloys thereof. Zirconium and associated alloys could also be used.

A conductive material 12 comprises the other component of the emissive element 28. The conductive material 12 can be copper or silver or other conductive metal, and preferably resists oxidation and retains its conductive properties at high temperatures. The conductive material 12 provides a path for the arc to travel from the emissive element periphery 21 to the element center region 27, thus reducing start erosion of the element. In particular, the conductive material 12 supports the arc during the initial period of operation so that a large amount of heat is not rapidly transferred to the oxide layer formed on the emissive element 28. The oxide layer warms up to the operating temperature of the torch more slowly which reduces the tendency of the oxide layer to crack (either internally or at the interface of the oxide layer and the remainder of the element 28) as a result of thermal strain. The oxide layer thus does not become separated from the element 28 and, upon reaching the operating temperature, becomes sufficiently conductive and emissive to support the arc in preference to the conductive material. Because the oxide layer is not lost upon initiation of the arc, start erosion is reduced and undesirable double arcing will also be reduced.

Figure 4:
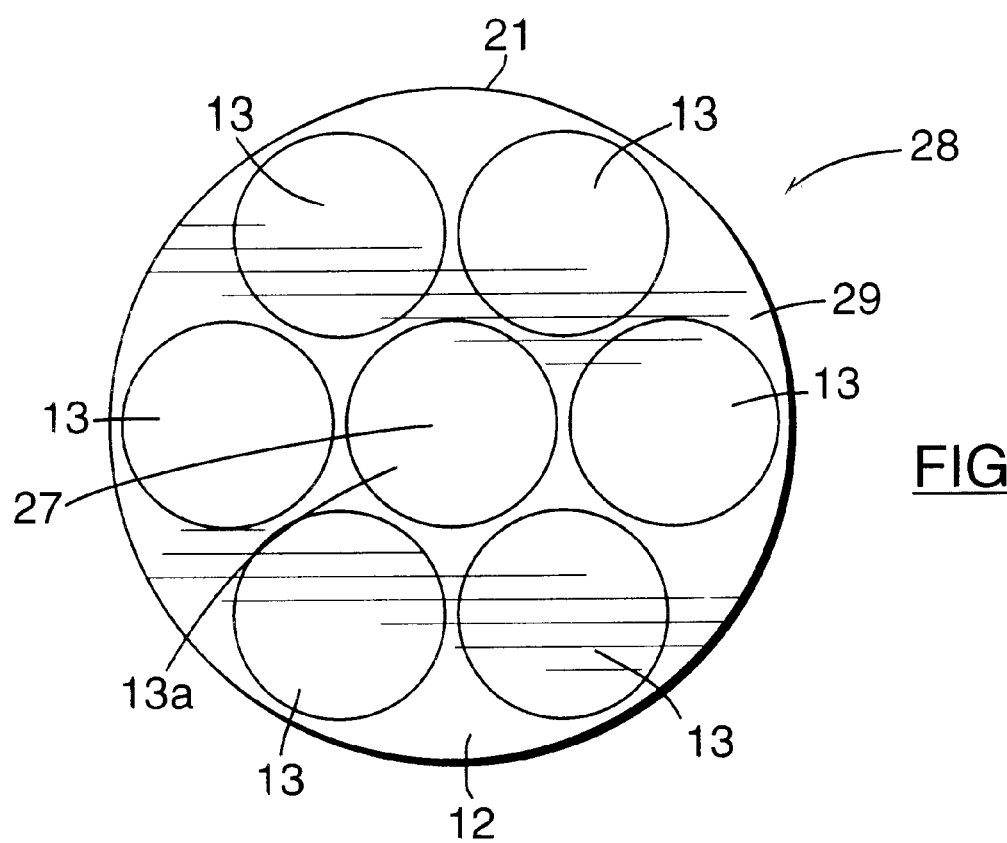
FIG. 4 is an axial end view of an emissive element which embodies the features of the present invention.

It is not necessary for the bulk or major portion of the element to comprise the emissive material 13. For example, the embodiment of FIG. 4 is formed by bundling together a plurality of wires 13, filaments or the like of emissive material and then immersing the bundle in a molten conductive metal 12, such as silver. The wires 13 may be wound together or merely placed in a predetermined spaced relationship. The silver 12 fills the interstitial spaces between the emissive wires and, once cooled, provides a cylinder with several conductive paths from the outer edge of the element to the center emissive wire 13a. The pilot arc is relatively small in diameter and is centered on the center wire 13a, which has a diameter of about 0.025", shortly after startup. The subsequent main or cutting arc (which uses a higher current) is larger in diameter and attaches to all of the emissive wires, having a combined diameter of about 0.075", once initiated.

Figure 7A:
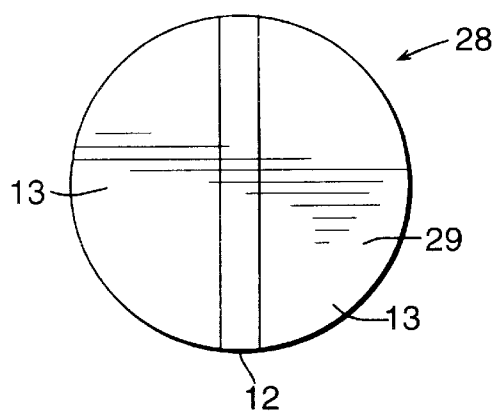
FIGS. 7A–7F are end views of alternative embodiments of the present invention.
Figure 7B:
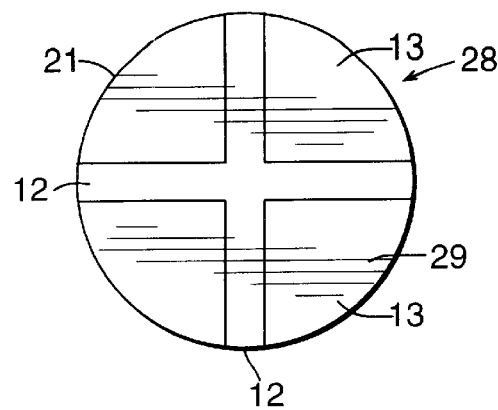
Figure 7C:
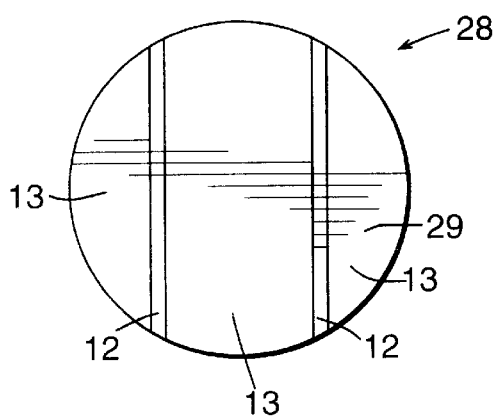
Figure 7D:
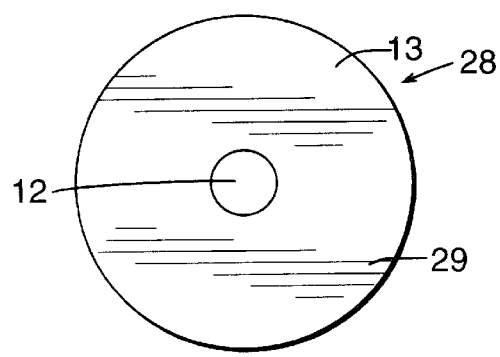
Figure 7E:
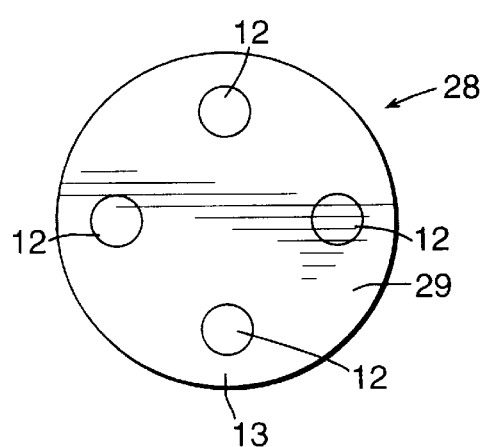
Figure 7F:
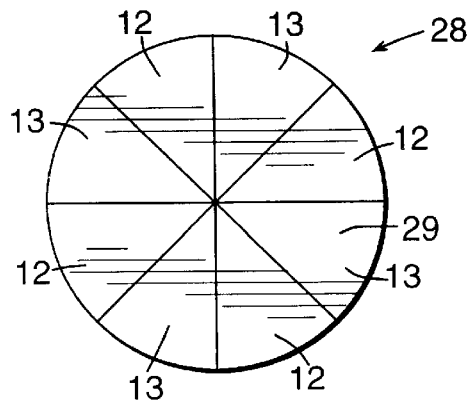

Several other embodiments of the invention are illustrated in FIGS. 7A–7F. FIG. 7A illustrates a single diametrically extending layer 12 constituting the conductive path. The diameter of the emissive element 28 is approximately 0.076" and the layer 12 thickness is approximately 0.005". Other conductive paths can also accomplish the objective, including those illustrated in FIGS. 7B–7F. For example, the conductive path can be in the form of two intersecting or non-intersecting layers 12 as illustrated in FIGS. 7B and 7C. In addition, one or more relatively small discrete areas 12 or spots can be distributed across the circular outer face of the element 10 as illustrated in FIGS. 7D and 7E. Another alternative embodiment is illustrated in FIG. 7F and includes alternating sectors of emissive material 13 and conductive material 12.

Figure 5:
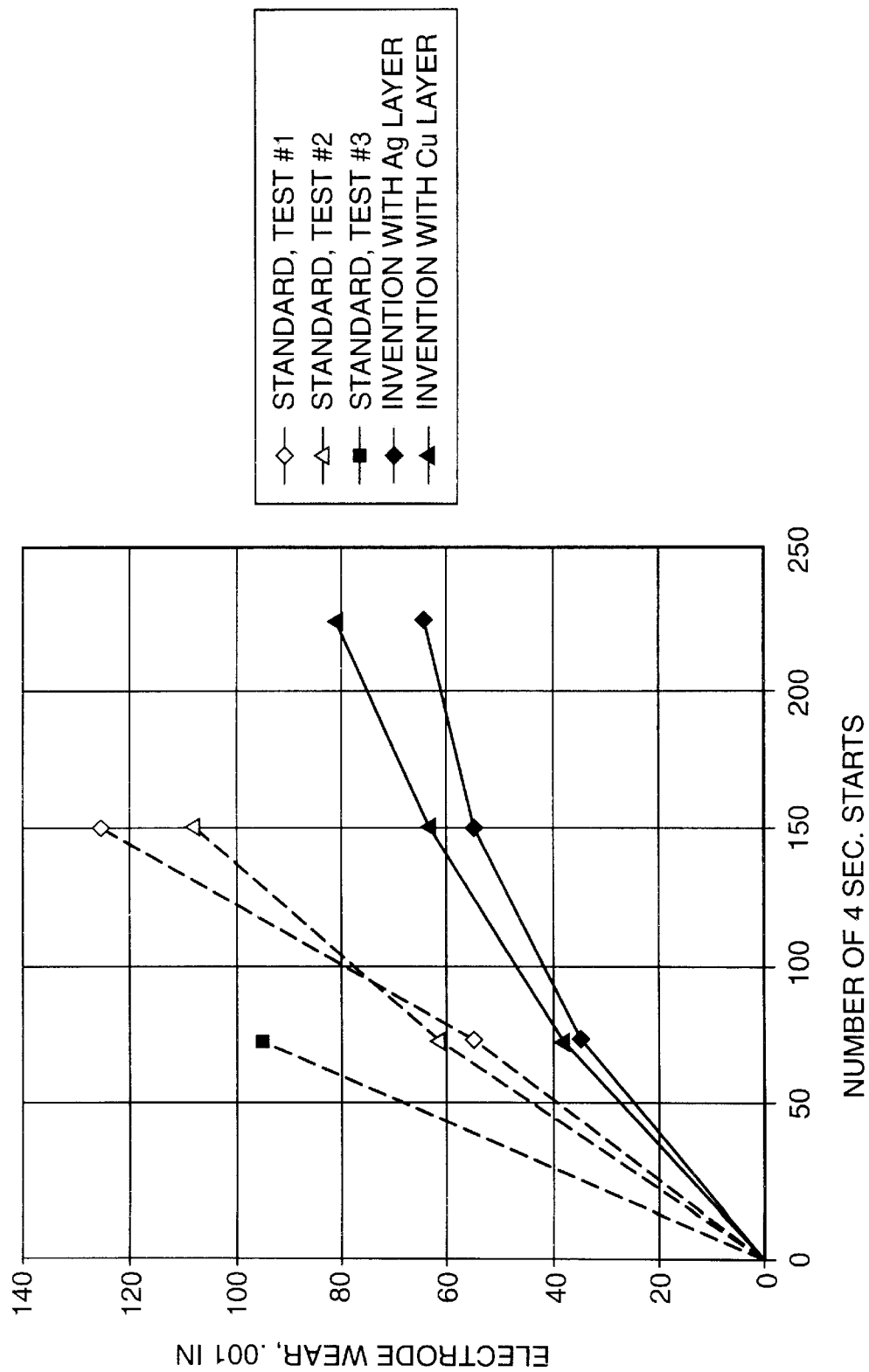
FIGS. 5–6 are graphical representations of performance figures obtained through comparative testing.
Figure 6:
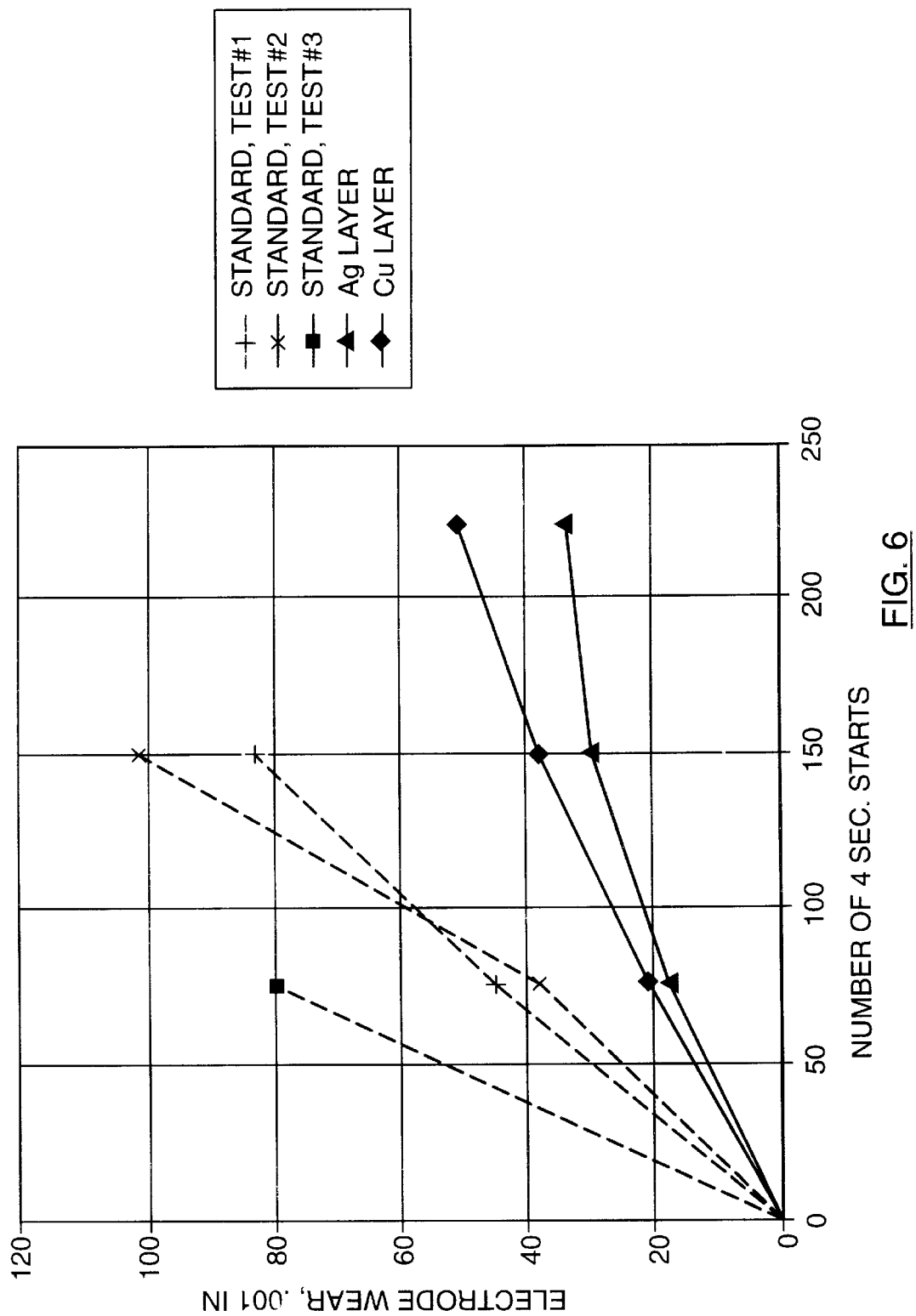

Referring to FIGS. 5–6, electrodes which embody the features of the present invention clearly outperform current electrodes in terms of start erosion. To perform the tests documented in FIGS. 5–6, electrodes of the type illustrated in FIG. 7A, using hafnium as the emissive material 13 and both silver and copper as the conductive material 12, were compared to several different standard electrodes; i.e., electrodes without a conductive path layer. For the data illustrated in FIG. 5, all of the electrodes were cycled at 300 A with an arc for four seconds and then without an arc for four seconds for approximately thirty minutes. As can be seen, the electrodes of the present invention exhibited greatly reduced overall erosion compared to the standard electrodes, and were also capable of achieving more starts.

For the start erosion test data illustrated in FIG. 6, a continuous test was conducted to determine a continuous operating erosion rate for each of the electrodes. The start erosion of FIG. 6 was then isolated by subtracting the electrode wear due to continuous running from the total erosion observed in the tests illustrated in FIG. 5. After approximately 150 starts, the electrodes which embodied the features of the present invention displayed a greatly reduced start erosion.

In the drawings and specification, there has been set forth preferred embodiments of the invention, and although specific terms are employed, they are used in a generic and descriptive sense only and not for purposes of limitation.

What is claimed:

1. An emissive element for supporting an electric arc in a plasma arc torch using an oxygen gas to create the plasma, said element comprising:

a body having a front face for supporting the electric arc, said front face being defined by at least two distinct components formed from different materials, said materials comprising:

an emissive material having a low work function for readily emitting electrons in support of the arc and being reactive with the oxygen plasma gas to form an oxide during an operation of the torch, said oxide forming an electrically resistive layer on the front face of the body upon cooling subsequent to the operation of the torch; and a conductive metal material having an electrical conductivity greater than the oxide layer for supporting the arc during the initiation of a subsequent torch operation at least until the oxide reaches an operating temperature, the conductive material being disposed on the front face of the body in a predetermined pattern defining a path from a periphery of the front face toward a central region thereof.

2. An emissive element as defined in claim 1 wherein said front face defines a periphery at which the arc is supported upon initiation of the torch and a central region at which the arc is supported subsequent thereto, said conductive material defining at least one path from the periphery to the central region along which the arc can travel during the initiation of the torch.

3. An emissive element as defined in claim 2 wherein said path is continuous from the periphery to the central region.

4. An emissive element as defined in claim 1 wherein said emissive material comprises hafnium.

5. An emissive element as defined in claim 1 wherein the conductive material comprises silver.

6. An emissive element as defined in claim 1 wherein the conductive material comprises copper.

7. An emissive element as defined in claim 1 wherein the front face is generally circular and the conductive material defines a line extending across the front face.

8. An emissive element as defined in claim 1 wherein the front face is generally circular and the conductive material defines a pair of lines extending across and intersecting on the front face.

9. An emissive element as defined in claim 1 wherein the front face is generally circular and the conductive material defines a pair of parallel lines extending across the front face.

10. An emissive element as defined in claim 1 wherein the front face is generally circular and the conductive material defines a central portion of the front face.

11. An emissive element as defined in claim 1 wherein the front face is generally circular and the conductive material defines a plurality of discrete portions distributed across the front face.

12. An emissive element as defined in claim 1 wherein the front face is generally circular and the conductive material defines a plurality of smaller circular portions spaced in an array around the face.

13. An emissive element as defined in claim 1 wherein the front face is generally circular and comprises alternating sectors of emissive material and conductive material.

14. An emissive element for supporting an electric arc in a plasma arc torch, said element comprising:

an elongate body having a front face for supporting the electric arc, said body comprising;

a plurality of emissive filaments extending through the elongate body which define an array of adjacent emissive portions with interstices therebetween at the front face of the body, said filaments being formed of an emissive material having a low work function for readily emitting electrons in support of the arc; and an electrically conductive material filling the interstices between the adjacent emissive filaments at the front face of the elongate body.

15. An emissive element as defined in claim 14 wherein said front face defines a periphery at which the arc is supported upon initiation of the torch and a central region at which the arc is supported subsequent thereto, said conductive material defining at least one path from the periphery to the central region along which the arc can travel during the initiation of the torch.

16. An emissive element as defined in claim 15 wherein said path is continuous from the periphery to the central region.

17. An emissive element as defined in claim 14 wherein said emissive material comprises hafnium.

18. An emissive element as defined in claim 14 wherein the conductive material comprises silver.

19. An emissive element as defined in claim 14 wherein the conductive material comprises copper.

20. An electrode for supporting an electric arc in a plasma arc torch, said electrode comprising:

a metallic holder having a front face and a receptacle formed in the front face; and an emissive element mounted in the receptacle of the holder and having a front face substantially coplanar with the front face of the holder for supporting the electric arc, said front face of the emissive element being defined by at least two distinct components formed from different materials, said materials comprising:

an emissive material having a low work function for readily emitting electrons in support of the arc; and an electrically conductive metal material adjacent to said emissive material, the conductive material being disposed on the front face of the emissive element in a predetermined pattern defining a path from a periphery of the front face of the emissive element toward a central region thereof.

21. An electrode as defined in claim 20 and further comprising a relatively non-emissive separator mounted in the receptacle and defining an opening therein for supporting the emissive element.

22. An electrode as defined in claim 21 wherein said non-emissive separator is formed of a material from the group consisting of silver and alloys of silver.

23. An electrode as defined in claim 20 wherein said emissive material comprises hafnium.

24. An electrode as defined in claim 20 wherein the conductive material comprises silver.

25. An electrode as defined in claim 20 wherein the conductive material comprises copper.

26. A method of operating a plasma arc torch using an oxygen gas to create the plasma, said method comprising the steps of:

supplying an oxygen gas adjacent to an emissive element having a front face and being formed of two materials comprising an emissive material and a conductive material, the conductive material being disposed on the front face in a predetermined pattern defining a path from a periphery of the front face toward a central region thereof;

applying an electric potential to the emissive element such that an electrical arc is supported by the emissive material which is formed of a material having a relatively low work function;

oxidizing a portion of the emissive material adjacent to the arc;

disconnecting the electrical potential such that the arc is extinguished and the oxidized portion of the emissive material is allowed to cool and thereby form an electrically resistive oxide layer; and reapplying the electric potential to the emissive element and initiating an electric arc which is at least initially supported by the conductive material until the oxide layer reaches an operating temperature.

* * * * *